Jan. 12, 1971   L. E. COERVER, JR., ET AL   3,554,797
METHOD OF PRODUCING AN ENCAPSULATED INDUCTOR
WITH A HIGH VALUE OF PERMEABILITY
Filed May 26, 1967

Leo E. Coerver, Jr.,
Frank A. Pizzarello,
INVENTORS.

BY
ATTORNEY.

United States Patent Office 3,554,797
Patented Jan. 12, 1971

3,554,797
METHOD OF PRODUCING AN ENCAPSULATED INDUCTOR WITH A HIGH VALUE OF PERMEABILITY
Leo E. Coerver, Jr., and Frank A. Pizzarello, Santa Ana, Calif., assignors to Hughes Aircraft Company, Culver City, Calif., a corporation of Delaware
Filed May 26, 1967, Ser. No. 661,739
Int. Cl. C23c 3/00; H01f 15/02, 17/06
U.S. Cl. 117—227                                9 Claims

ABSTRACT OF THE DISCLOSURE

An inductor element (wire, coil, etc.) is fully encapsulated with an insulating ferromagnetic material to produce an encapsulated inductor having a high permeability magnetic circuit. The inductor element may have any arbitrary shape and is placed within a solution of encapsulating material and flux solvent at a high temperature. The temperature is slowly reduced at a rate sufficient to prevent flux occlusions and to allow the encapsulating material to crystallize on the element. A seed may be utilized and the seed may be threaded to serve as a guide for precisely wrapping the coil into its particular shape before encapsulation is commenced.

---

The present invention relates to an encapsulated inductor having a high permeability magnetic circuit and a method for making such an inductor.

There are many applications in which an inductor having a magnetic flux path of high permeability is required. Conventionally, such inductors comprise a wire which is coiled a sufficient number of times so that its inductance will be high. In order to increase the inductance without increasing the coil dimensions, magnetic material has been placed within and about the inductor and, when it was necessary to obtain a precise value of inductance, a movable iron core was disposed within the coil. With the exception of the specific design comprising a conductor closely wrapped about a torroidal core, spaces are present between the inductor and the magnetic material and result in leakage flux and air gaps in the magnetic flux path, thus preventing optimization of the total permeability of the inductor's magnetic circuit.

Various methods have been utilized to increase the value of the average permeability of the magnetic flux path for coils not wrapped about a torroidal core; however, not all methods have been entirely successful when applied to coils of arbitrary shape. As stated above, many inductors employ cores and wrappings of magnetic material which, because of their design, also include air gaps and are additionally very bulky. In order to overcome these problems, other inductors have been produced by painting an inductor element, such as a coil, with powdered ferrite suspended within a hardenable solution, such as curable plastics, and by hardening the plastic in order to coat the inductor element with the powdered ferrite. Although this method has produced inductors with a value of average permeability which is higher than that of conductors in air, the permeability of the total flux path was always less than that of the ferrite itself since the hardened supporting plastic, which has a relative permeability of unity, detracts from the overall permeability characteristics of the flux path.

The present invention overcomes these and other problems by providing complete encapsulation of an arbitrarily shaped inductor element within a magnetic material and by providing a method for obtaining such an inductor. Basically, the invention comprises an inductor element which is completely encased or encapsulated within an insulating ferromagnetic material, such as ferrite, so that no low permeability gaps appear within the magnetic circuit of the inductor. As used herein, an insulating ferromagnetic material is defined to mean any material which has a high value of permeability and which will insulate one part of the inductor element from another part. The method for producing the encapsulated inductor generally comprises the immersion of a specifically designed inductor element of arbitrary shape within a solution of a flux solvent and the encapsulating material and allowing the encapsulating material to crystallize from the solution about the element. Thus, it is possible to form the inductor element as a straight wire, a coil, a spiral, or any other desired shape and to form the encapsulating material about the element. In many cases, a seed of the encapsulating material is placed within the inductor element and both the element and the seed are immersed within the solution to aid the formation of encapsulating crystals about the inductor element. The use of a seed is particularly valuable when the inductor element is coiled as a cylindrical spiral so that it is possible to provide threads on the seed and to use the threaded seed as a guide for precisely wrapping the coil into its particular spiral shape. Consequently, the specific shape and spacing between the coils is maintained in a precise manner and the encapsulation thereof fixes the specific shape and spacing.

It is, therefore, an object of the present invention to provide an encapsulated inductor whose flux path has a high value of permeability.

It is another object of the invention to provide a method for fabricating such an inductor.

Other aims and objects, as well as a more complete understanding of the present invention will appear from the following explanation of an exemplary embodiment and the accompanying drawings thereof, in which.

Figure 1:
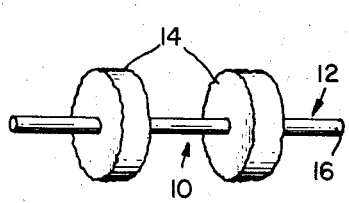
FIG. 1 is a view of a single wire provided with a pair of high permeability materials bonded thereto.
Figure 2:
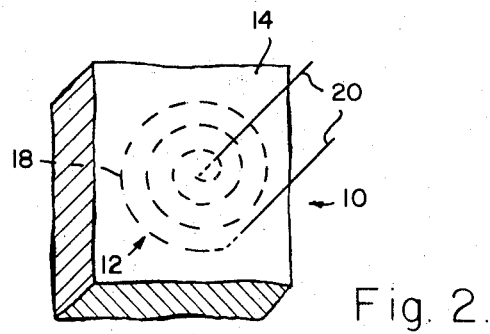
FIGS. 2 and 3 are views of spiral inductors encased in an insulating ferromagnetic material.
Figure 3:
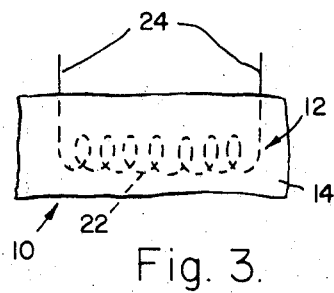

Accordingly, with reference to FIGS. 1–3, an inductor 10 comprises a wire or inductor element 12 encased within an insulating ferromagnetic material 14. In FIG. 1, the inductor element comprises a straight wire 16 onto which crystal beads of insulating ferromagnetic material 14 have been grown. In FIG. 2, the inductor element takes the shape of a spiral 18, for example, a spiral of Archimedes, which is completely and fully imbedded within insulating material 14. A pair of leads 20 extend from the coil and to the exterior of material 14 for connection to a circuit. In FIG. 3, element 12 takes the form of a cylindrical spiral 22 which is fully and completely encased within insulating ferromagnetic material 14. A pair of leads 24 extend from the spiral to the exterior of material 14 to enable connection of the encapsulated inductor within a circuit.

Figure 4:
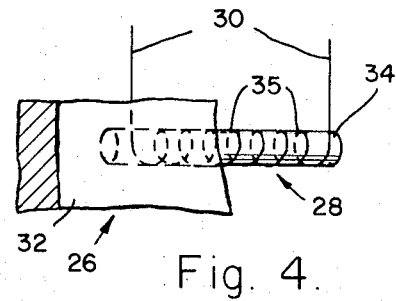
FIG. 4 is a view partly in section of a spiral coiled about a threaded seed and embedded in an insulating ferromagnetic encapsulating material.

A variation of the inductor of FIG. 3 is shown in FIG. 4 with a portion of the encapsulating material stripped away. Here, an inductor 26 comprises an inductor element 28 formed in the shape of a cylindrically extending spiral. Leads 30 extend from the element to permit circuit connections. Coil 28 is completely encased within encapsulating material 32. To ensure complete encasement of the inductor element, internal seed 34 having a thread 35 is placed interior of element 28. The seed, which is an integral part of material 32, comprises a cylinder having a precisely machined thread 35 formed on its surface. During manufacture of the inductor, coil 28 is wound about the cylindrical seed within the grooves to provide precise formation of the coil. Thus, the fabricated inductor is coiled in a precise manner.

Encapsulating material 14 and 32, including seed 34, is formed from an insulating ferromagnetic material to provide a high value of permeability for the magnetic circuit of the inductor. Since the induction of any coil is equal to the lines of the flux divided by the current causing them, when the coil is completely imbedded within the high permeability material, the flux lines are mostly contained within the material. This material of high permeability provides a very low reluctance path for the flux lines, consequently providing an inductor having a large number of flux lines per unit of current. Since insulating ferromagnetic materials exhibit high permeability characteristics, any such material is suitable for use in encapsulating the inductor element. Such materials include, but are not limited to, ferrites, yttrium-iron garnets (YIG) and rare earth-iron garnets.

The inductor element may consist of any suitable metal which is compatible with the encapsulating material. Since the method employed to form the encapsulated inductors of the present invention, as will hereinafter become evident, includes the use of a corrosive flux solvent at a high temperature, the preferred materials which form the inductor element must have a melting point which is above that of the solution and must have the ability to withstand corrosion or oxidation by the flux solvent. In general, such inductor element materials consist essentially of the group including ruthenium, rhodium, palladium, iridium, osmium and platinum.

Figure 5:
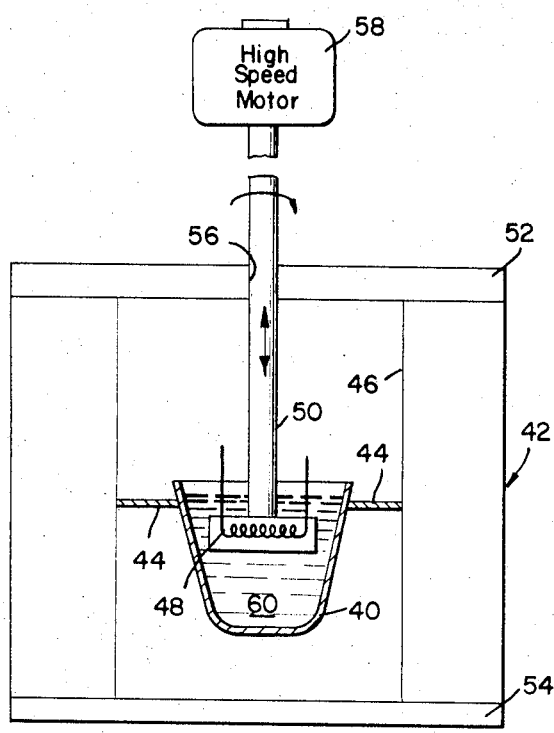
FIG. 5 is a schematic view of the apparatus used in the method to fabricate the inductors depicted in FIGS. 1-4.

The encapsulated inductors disclosed above can be fabricated by the inventive method utilizing the apparatus depicted in FIG. 5. A crucible 40, formed from platinum or other corrosion resistant material, is disposed to hold a solution of the encapsulating material in a flux solvent. The crucible is supported within a furnace 42 by means of supports 44 which are secured to the crucible and the interior 46 of the furnace. In practice, the solution constituents are placed within the crucible. An inductor element 48, which has been preformed into a specified shape, is placed and held at the end of a support rod 50 by any suitable means. The element may be supported at several points so that its shape will not be distorted during encapsulation by the ferromagnetic material. The support rod and inductor element are then placed within the furnace which is closed by means of covers 52 and 54. Cover 52 is provided with an opening 56 for reception of rod 50. A high speed motor and rod lifting device 58 is then secured to the exterior part of rod 50. An atmosphere, such as air or oxygen, compatible with the flux, is provided within the furnace.

The flux and encapsulating constituents comprising the solution are then heated to above their melting points to prepare the solution. The heat is maintained for a time sufficient to bring the solution to equilibrium, i.e., to enable it to form a melt and to become a homogeneous combination of the molten encapsulating material in the flux solvent. Sufficient heat is imparted to the solution by furnace 42 so that the temperature of the solution is below its saturation concentration. The coil is then immersed in the solution by lowering rod 50, and the rod and coil are rapidly rotated at a rate which will maintain a homogeneous mixture of solution ingredients and which will eliminate gradients of concentration of the various constituents. Generally, since the solution is viscous, the rotation is high to maintain homogeneity of the constituents throughout the solution; however, the rotation is not so high that the conductor will deform. The temperature of the furnace and, consequently, the solution is slowly reduced at a rate sufficient to prevent flux occlusions. As the temperature of the solution is lowered, a supersaturation concentration of the solution is approached at which point crystals of encapsulating material begin to form on the inductor element. The temperature is permitted to drop at a controlled rate to increase the mass of crystals until the desired amount of crystal is formed about the element. The temperature drop is then stopped and the coil is extracted from the solution and held thereabove and rotated to permit excess solution to be removed as, for example, by dripping. The entire furnace is then cooled at its normal rate to room temperature and the encapsulated coil is removed. The encapsulated inductor may be placed within a concentrated hot acidic solution to remove any excess flux solvent which may not have been previously removed.

If desired, a seed of the desired encapsulating material, such as seed 34 of FIG. 4 may be placed within a cylindrical coil to provide a means by which crystallization will be facilitated. The seed may be first prepared by any suitable means and a thread may be formed on the seed so that element 28 can be coiled precisely about the seed. In addition, threading prevents separation between the coil and the seed during rotation thereof within flux 60 and permits the coil to maintain its shape while crystals are formed about the coil.

EXAMPLE

An inductor comprising a platinum coil encased in a yttrium-iron-garnet (YIG) was prepared. The coil was formed from a platinum ribbon and wound into its desired shape. Supports were secured to the coil at several points thereof and the supports were secured to a rotation and drop rod, such as rod 50 of FIG. 5.

A solution comprising 54% barium oxide, 15% boron oxide and 31% yttrium-iron-garnet, by weight, was prepared. Both the barium oxide and boron oxide were used as flux solvents for the YIG material in order to enhance the solubility of the YIG material and to permit the process to be performed at a temperature which is lower than the melting point of YIG per se. The solvent also acted as an aid to prevent a separation of phases between the components of the YIG material. Instead of using a prepared yttrium-iron-garnet material, a stoichiometric mixture of iron oxide and yttrium oxide may be placed together with the oxides of barium and boron, for example, a mixture including two and one-half moles of $Fe_2O_3$ and one and one-half moles of $Y_2O_3$, to yield an empirical formula of $Y_3Fe_5O_{12}$.

The solution prepared from the above constituents was placed in a crucible, such as crucible 40 of FIG. 5, within a furnace. The rod with attached coil was secured in place in the furnace above the crucible and the furnace was closed. An atmosphere of air was used within the furnace.

The furnace was heated to a temperature of approximately 1250° C. At this temperature the molten solution is below its saturation concentration. This temperature was maintained for some time until the solution became homogeneous and achieved equilibrium. The coil was immersed in the solution or melt and rapidly rotated at approximately 180 revolutions per minute to aid the maintenance of a homogeneous solution, to eliminate concentrations of solution constituents, and to maintain an even temperature throughout the solution and the coil.

The temperature of the furnace and solution was then slowly reduced at a rate of 1° C./hour. When the solution exceeded its saturation concentration, crystals of YIG began to precipitate out of the solution and form on the coil. The temperature continued to drop until an amount of YIG had been deposited and grown in the coil, the amount being sufficient to completely encapsulate the coil.

The temperature drop was then halted and the encapsulated coil was withdrawn from the solution. Rotation of the encapsulated coil was continued above the crucible to allow excess flux to be removed. The furnace was then slowly cooled to room temperature at its normal rate and the formed inductor was removed from its support rod.

The coil was then placed in a hot solution of concentrated hydrochloric acid to remove any further flux. Thereafter, the encapsulated coil was cleansed of the acid and prepared for use in an electronic circuit.

Although the invention has been described with reference to a particular embodiment thereof, it should be realized that various changes and modifications may be made therein without departing from the spirit and scope of the invention.

What is claimed is:

1. A method for producing an encapsulated inductor comprising the steps of:
   utilizing a solution including an insulating encapsulating ferromagnetic material of high permeability,
   immersing an inductor element in the solution, the element being compatible with the solution and having a melting point above the temperature of the solution,
   maintaining homogeneity of the solution,
   lowering the temperature of the solution below its saturation oncentration point at a rate sufficient to prevent flux occlusions and to enable crystallization of the encapsulating material from solution onto the inductor element until the element is completely encapsulated with the crystallized material, and
   removing the encapsulated inductor from the solution.

2. A method as in claim 1 wherein said step of maintaining homogeneity of the solution comprises the step of rapidly rotating the inductor element without deformation thereof while immersed in the solution.

3. A method as in claim 1 further including the step of placing a seed of the desired encapsulating material with the inductor element prior to said immersing step and retaining the seed with the element during said immersing and lowering steps.

4. A method as in claim 1 wherein the solution comprises a homogeneous mixture of the ferromagnetic material and a flux solvent and wherein said temperature lowering step is effected at a sufficiently slow rate to prevent flux occlusions.

5. A method as in claim 1 further including the steps of removing the encapsulated inductor from the solution and holding the temperature of the solution constant to remove excess solution from the encapsulated inductor.

6. A method as in claim 1 wherein the solution includes a flux solvent and further including the step of placing the removed and encapsulated inductor in a flux removing solution to remove any excess flux solvent from the encapsulating material.

7. A method as in claim 1 wherein the inductor element consists of a material selected from ruthenium, rhodium, palladium, osmium, iridium, platinum and alloys thereof.

8. A method as in claim 1 wherein the solution includes a flux solvent to permit dissolving the ferromagnetic material in the solution.

9. A method for producing an encapsulated inductor comprising the steps of utilizing an inductor element having a desired shape and encapsulating the inductor element with an insulating material having a high value of permeability by crystallizing the insulating material from a supersaturated homogeneously maintained solution onto the element by lowering the temperature of the solution while preventing the formation of flux occlusions, the inductor element being immersed in and compatible with and having a melting point above the temperature of the solution.

References Cited

UNITED STATES PATENTS

| 2,199,227 | 4/1940 | Marks | 117—113X |
|---|---|---|---|
| 3,117,934 | 1/1964 | Linares, Jr. | 252—62.63X |
| 3,200,011 | 8/1965 | Baker | 117—231X |
| 2,966,704 | 1/1961 | O'Brian et al. | 336—83X |

FOREIGN PATENTS

| 840,708 | 7/1960 | Great Britain | 117—113 |

ALFRED L. LEAVITT, Primary Examiner

T. E. BOKAN, Assistant Examiner

U.S. Cl. X.R.

23—301, 305; 29—602, 606; 117—113, 231, 235, 237; 336—83